(12) United States Patent
Mu et al.

(10) Patent No.: US 12,535,896 B2
(45) Date of Patent: Jan. 27, 2026

(54) WRITING DEVICE, INTELLIGENT WRITING BOARD AND METHOD FOR SETTING COLOR OF ELECTRONIC HANDWRITING

(71) Applicant: BOE Technology Group Co., Ltd., Beijing (CN)

(72) Inventors: Xinxin Mu, Beijing (CN); Shuo Chen, Beijing (CN); Zilong Du, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 525 days.

(21) Appl. No.: 17/755,589

(22) PCT Filed: Mar. 31, 2021

(86) PCT No.: PCT/CN2021/084675
§ 371 (c)(1),
(2) Date: May 3, 2022

(87) PCT Pub. No.: WO2022/205170
PCT Pub. Date: Oct. 6, 2022

(65) Prior Publication Data
US 2024/0176431 A1    May 30, 2024

(51) Int. Cl.
*G06F 3/0354* (2013.01)
*G01J 3/50* (2006.01)
(Continued)

(52) U.S. Cl.
CPC ............ *G06F 3/03545* (2013.01); *G01J 3/50* (2013.01); *G06F 3/04162* (2019.05); *G06F 3/04883* (2013.01); *G06F 2203/04105* (2013.01)

(58) Field of Classification Search
CPC .... G06F 3/0354; G06F 3/04162; G06F 3/042; G06F 3/0488; G06F 2203/04108;
(Continued)

(56) References Cited

U.S. PATENT DOCUMENTS

| 6,111,565 A * | 8/2000 | Chery | G06F 3/0418 |
| | | | 178/19.02 |
| 2002/0080125 A1* | 6/2002 | Ikeda | G06F 3/03545 |
| | | | 345/173 |

(Continued)

FOREIGN PATENT DOCUMENTS

| CN | 101109659 A | 1/2008 |
| CN | 101515040 A | 8/2009 |

(Continued)

*Primary Examiner* — Temesghen Ghebretinsae
*Assistant Examiner* — Ivelisse Martinez Quiles
(74) *Attorney, Agent, or Firm* — Workman Nydegger

(57) ABSTRACT

A writing device, an intelligent writing board and a method for setting a color of electronic handwriting are provided. The writing device includes: a detection component, configured to obtain detection data of a use state of a writing pen, where the use state includes a writing state and a non-writing state; a communication component, configured to transmit the detection data and color-related information of the writing pen to the intelligent writing board, so that the intelligent writing board determines the use state of the writing pen according to the detection data, and when the use state of the writing pen is determined to be the writing state, a color of electronic handwriting of the writing pen obtained during the writing state of the writing pen is set to be a color corresponding to the color-related information.

9 Claims, 8 Drawing Sheets

(51) Int. Cl.
*G06F 3/041* (2006.01)
*G06F 3/04883* (2022.01)

(58) Field of Classification Search
CPC ....... G06F 2203/04114; G06F 3/04845; G06F 3/04883; G06F 3/03545; G06F 2203/04105; G06F 1/163; G06F 3/014; G06F 3/0416; G06F 3/0383; G06F 3/0445; G06F 3/0446; G06F 3/044; G06F 2203/04101; G01J 3/50; B43L 1/00
See application file for complete search history.

(56) References Cited

U.S. PATENT DOCUMENTS

| | | | | |
|---|---|---|---|---|
| 2007/0268278 | A1* | 11/2007 | Paratore | G06F 3/03545 345/179 |
| 2012/0170962 | A1* | 7/2012 | Nwapa-Jourdan | B43K 23/012 401/8 |
| 2014/0285473 | A1* | 9/2014 | Chang | G06F 3/0421 345/175 |
| 2015/0234524 | A1* | 8/2015 | Zhang | G06F 3/016 345/173 |
| 2017/0036349 | A1* | 2/2017 | Dubrovsky | G05D 1/027 |
| 2017/0308184 | A1* | 10/2017 | Kato | G06F 3/0383 |
| 2021/0055807 | A1* | 2/2021 | Ogata | G06F 3/03545 |

FOREIGN PATENT DOCUMENTS

| | | |
|---|---|---|
| CN | 102023728 A | 4/2011 |
| CN | 203786706 U | 8/2014 |
| CN | 104076950 A | 10/2014 |
| CN | 105667136 A | 6/2016 |
| CN | 111694452 A | 9/2020 |
| CN | 111753819 A | 10/2020 |
| JP | 2002331796 A | 11/2002 |
| JP | 2009078568 A | 4/2009 |

* cited by examiner

WRITING DEVICE, INTELLIGENT WRITING BOARD AND METHOD FOR SETTING COLOR OF ELECTRONIC HANDWRITING

CROSS REFERENCE TO RELATED APPLICATIONS

The present disclosure is a US National Stage of International Application No. PCT/CN2021/084675, filed on Mar. 31, 2021, the entire contents of which are incorporated herein by reference.

FIELD

The present disclosure relates to the field of intelligent teaching, in particular to a writing device, an intelligent writing board and a method for setting a color of electronic handwriting.

BACKGROUND

With continuous popularization of intelligent blackboard products in the field of teaching, users have higher and higher requirements for the intelligent blackboard products.

An existing intelligent blackboard product is generally composed of a large touch screen (including capacitive, infrared, electromagnetic and other touch technologies), as well as a traditional blackboard or a nano-blackboard located on both sides or one side of the large touch screen. On the whole intelligent blackboard (including the large touch screen and the traditional blackboard), an infrared touch frame is integrated on a side of the traditional blackboard to convert ordinary chalk blackboard writing into corresponding electronic handwriting. The large touch screen in the intelligent blackboard is usually configured with an Open Pluggable Specification (OPS) module of an Android system or a Windows system. The large touch screen recognizes a movement track of a chalk and electronizes the content of chalk blackboard writing through application layer software in its operating system.

SUMMARY

In a first aspect, a writing device provided by an embodiment of the present disclosure is used with a writing pen, and the writing device includes: a detection component, configured to obtain detection data of a use state of the writing pen, where the use state includes a writing state and a non-writing state; and a communication component, configured to send the detection data and color-related information of the writing pen to an intelligent writing board, to enable the intelligent writing board to determine the use state of the writing pen according to the detection data, and when the use state of the writing pen is determined to be the writing state, to set a color of electronic handwriting of the writing pen obtained during the writing state of the writing pen to be a color corresponding to the color-related information.

In a possible implementation, the detection component includes: a pressure sensor, configured to detect the use state of the writing pen; or a state switching key, configured to set the use state of the writing pen in response to an operation of a user.

In a possible implementation, the communication component includes a near-field communication element or a Bluetooth communication element.

In a possible implementation, the writing device further includes: a containing part, being of a hollow structure, and configured to contain the writing pen.

In a possible implementation, the detection component is arranged on an outer wall of the containing part.

In a possible implementation, the writing device further includes: a fixing structure, arranged in an inner wall of the containing part and configured to fix the writing pen.

In a possible implementation, the fixing structure includes: a damping structure; or at least two spring sheets, defining a funnel-shaped structure with an opening gradually decreasing in a first direction, where the first direction is a direction in which the writing pen enters the containing part.

In a possible implementation, the writing device further includes: an indication component, arranged on an outer wall of a containing part and configured to indicate a color corresponding to the writing device.

In a possible implementation, the writing device further includes: a color determination component, configured to determine a color of the writing pen.

In a possible implementation, the color determination component includes: a color sensor, configured to recognize the color of the writing pen; or a color switching key, configured to switch a color currently corresponding to the writing device in response to the user, wherein different states switched by the color switching key correspond to different colors.

In a possible implementation, the color sensor is arranged in the inner wall of the containing part; or the color sensor is arranged at an opening end of the containing part, and the opening end is an end close to the handwriting when the writing pen is used.

In a possible implementation, the writing device includes wearable equipment.

In a second aspect, an embodiment of the present disclosure provides an intelligent writing board, including a touch device and a writing panel, wherein the touch device is configured to recognize handwriting formed in the writing panel, and includes: the writing device described as the first aspect.

The intelligent writing board is configured to receive the detection data and the color-related information of the writing pen sent by the writing device, wherein the detection data are data corresponding to the use state of the writing pen; the use state of the writing pen is determined according to the detection data; and when the use state of the writing pen is determined to be a writing state, the color of electronic handwriting of the writing pen obtained during the writing state of the writing pen is set to be the color corresponding to the color-related information.

In a third aspect, an embodiment of the present disclosure provides a method for setting a color of electronic handwriting, applied to a writing device for use with a writing pen, and including: obtaining, by a detection component, detection data of a use state of the writing pen, wherein the use state of the writing pen includes a writing state and a non-writing state; and sending the detection data and color-related information of the writing pen to an intelligent writing board, to enable the intelligent writing board to determine the use state of the writing pen according to the detection data, and when the use state of the writing pen is determined to be the writing state, to set a color of electronic handwriting of the writing pen obtained during the writing state of the writing pen to be a color corresponding to the color-related information.

In a possible implementation, the color-related information includes: an equipment identifier of the writing device, or color information of the writing pen.

In a possible implementation, when the color-related information includes the color information of the writing pen, before sending the detection data and the color-related information to the intelligent writing board, the method further includes: determining the color information according to a current state of a color switching key, wherein the color switching key includes a plurality of states, and each state corresponds to a color; or determining the color information according to information that a photoelectric sensor detects that the writing pen is taken away.

In a possible implementation, when the color-related information includes the equipment identifier, the writing device has a binding relationship with a specified color; and when a user uses the writing device, a color of the writing pen is consistent with the specified color.

In a possible implementation, when the color-related information includes the equipment identifier and the color information of the writing pen, before transmitting the detection data and the color-related information of the writing pen to the intelligent writing board, the method further includes: obtaining the color information by recognizing, by a color sensor, a color of the writing pen.

In a possible implementation, the method further includes: indicating the color of the writing pen according to the color-related information.

In a fourth aspect, an embodiment of the present disclosure provides a method for setting a color of electronic handwriting, applied to an intelligent writing board, and including: receiving detection data corresponding to a use state of a writing pen and color-related information of the writing pen sent by a writing device, wherein the writing device is used with the writing pen, and the use state includes a writing state and a non-writing state: determining the use state of the writing pen according to the detection data; and setting, when the use state of the writing pen is determined to be the writing state, a color of electronic handwriting of the writing pen obtained during the writing state of the writing pen to be a color corresponding to the color-related information.

In a possible implementation, the color-related information includes: an equipment identifier of the writing device, or color information of the writing pen.

In a possible implementation, the setting the color of the electronic handwriting of the writing pen obtained during the writing state of the writing pen to be the color corresponding to the color-related information, includes: when the color-related information includes the equipment identifier, obtaining a corresponding set color from a binding relationship between the equipment identifier and the color of the writing pen according to the equipment identifier; and setting the color of the electronic handwriting obtained during the writing state of the writing pen to be the set color.

In the possible implementation, the setting the color of the electronic handwriting of the writing pen obtained during the writing state of the writing pen to be the color corresponding to the color-related information, includes: when the color-related information includes the color information of the writing pen, setting the color of the electronic handwriting obtained during the writing state of the writing pen to be a corresponding color according to the color information of the writing pen.

In a fifth aspect, an embodiment of the present disclosure further provides a device for setting a color of electronic handwriting, including: at least one processor: and a memory connected with the at least one processor, wherein the memory stores instructions executable by the at least one processor, and the at least one processor executes the method described as the third aspect or the fourth aspect by executing the instructions stored in the memory.

In a sixth aspect, an embodiment of the present disclosure further provides a readable storage medium, including: a memory, wherein the memory is configured to store instructions, when the instructions are executed by a processor, a device including the readable storage medium is enabled to complete the method described as the third aspect or the fourth aspect.

DETAILED DESCRIPTION OF THE EMBODIMENTS

When writing on a traditional blackboard, a user (such as a teacher) may use chalks of different colors to mark or underline and the like. However, data returned by a current application software layer through an infrared touch box cannot determine whether the user has marked or underlined some written contents, resulting in the inaccuracy of electronization of chalk blackboard content.

In the related art, in order to solve the problems, the common solution in the market at present is to change the writing color by 'setting' in application software, but this is a global modification, and the operation is very complex when writing in multiple colors. For example, from white to red to white, it needs to enter the 'setting' twice to change the color, the operation is very cumbersome, which is not suitable for teaching habits of teachers writing as they use.

Embodiments of the present disclosure provide a writing device, an intelligent writing board and a method for setting a color of electronic handwriting, so as to solve the above problems existed in the related art.

In order to better understand the above technical solutions, the technical solutions of the present disclosure will be described in detail below with reference to the accompanying drawings and specific embodiments. It should be understood that the embodiments of the present disclosure and the specific features in the embodiments are detailed descriptions of the technical solutions of the present disclosure, rather than limitations of the technical solutions of the present disclosure. In the case of no conflict, the embodiments of the present disclosure and the technical features in the embodiments can be combined with each other.

Figure 1:
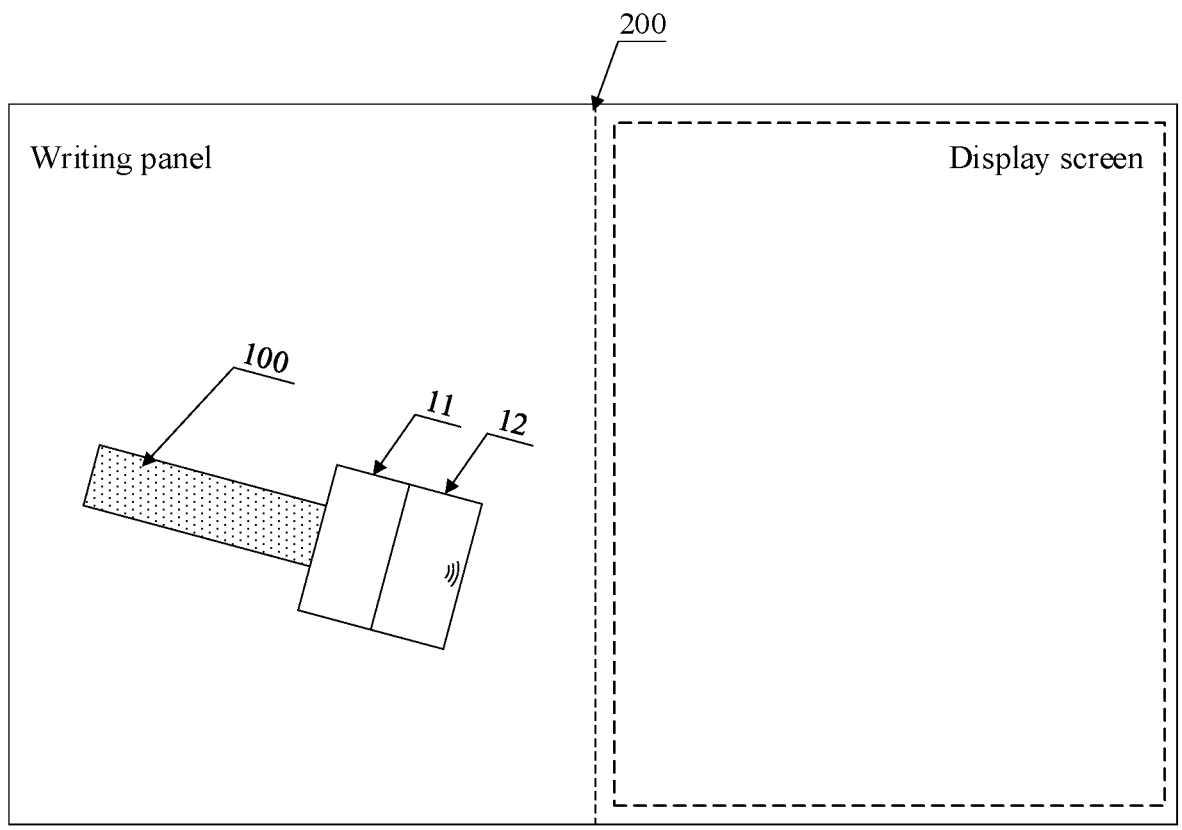
FIG. 1 is a schematic structural diagram of a writing device provided by an embodiment of the present disclosure.

Referring FIG. 1, which is a schematic structural diagram of a writing device provided by an embodiment of the present disclosure. The writing device is used with a writing pen 100, and includes a detection component 11 and a communication component 12.

The detection component 11 is configured to obtain detection data of a use state of the writing pen 100. The use state includes a writing state and a non-writing state. The non-writing state includes a state where the writing pen 100 is holding in user's hand to pause writing, a state where the writing pen 100 is placed on other objects (such as a lectern), and the like. The writing pen 100 may be a chalk, a marker pen, a whiteboard pen, or the like.

The communication component 12 is configured to send the detection data and color-related information of the writing pen 100 to an intelligent writing board 200, so that the intelligent writing board 200 determines the use state of the writing pen 100 according to the detection data, and when the use state of the writing pen 100 is determined to be the writing state, sets a color of electronic handwriting of the writing pen 100 obtained during the writing state of the writing pen 100 to be a color corresponding to the color-related information. For example, if it is determined that the use state of the writing pen 100 is the writing state at the current time at 9:00, the color of the electronic handwriting of the writing pen 100 obtained starting from 9:00 may be set to be a color corresponding to the color-related information until the use state of the writing pen 100 is changed into the non-writing state; or if it is determined that the use state of the writing pen 100 is changed into the writing state at the current time at 9:00, and the use state of the writing pen 100 is changed into the non-writing state at 9:08, the writing pen 100 is always be in the writing state from 9:00 to 9:08, and the color of the electronic handwriting of the writing pen 100 obtained during a period of 9:00 to 9:08 may be set to be the color corresponding to the color-related information.

It should be noted that a position shown by the detection component 11 in FIG. 1 does not represent its actual position.

The communication component 12 includes a low-power-consumption communication element, and the low-power-consumption communication element may include a near-field communication element or a Bluetooth communication element.

The intelligent writing board 200 may include a writing panel (such as a traditional blackboard, a nano-blackboard, a whiteboard, a whiteboard sticker, a rewritable wall sticker, a writing board, and a drawing board) and a display screen. A touch frame (such as an infrared touch frame and a capacitive touch frame) is further included usually on one side or opposite sides of the writing panel and configured to detect a writing track of the user on the writing panel. The intelligent writing board 200 generates corresponding electronic handwriting according to the writing track. The intelligent writing board 200 may include a control host. The control host may be integrated with the intelligent writing board 200, or may be independent of the intelligent writing board 200.

When the color corresponding to the writing device is set, for example, a color corresponding to the writing device is set to be red, an equipment identifier and a corresponding color red of the writing device are recorded in the intelligent writing board 200. When the user uses the writing device of which the corresponding color is red, according to the color marked by the writing device (for example, a shell of the writing device is set to be red), the user needs to take a red writing pen when taking the writing pen 100. When the detection component 11 detects the use state of the writing pen 100 and obtains corresponding detection data (for example, the detection component 11 is a pressure sensor, and the detection data may be pressure data), the equipment identifier is used as the color-related information of the writing pen 100 to be sent to the intelligent writing board 200 together with the detection data. When receiving the detection data and the equipment identifier sent by the writing device, the intelligent writing board 200 determines that the color of the writing pen 100 is red according to a corresponding relationship between the equipment identifier and the color stored locally. When the pressure data exceed a writing pressure threshold, it is determined that the use state of the writing pen 100 is the writing state, and the corresponding obtained electronic handwriting is set to be red.

Of course, the color corresponding to the writing device may also be set by the user autonomously, for example, one writing device is bound with a color, and during use, the user takes the writing pen 100 of the color corresponding to the writing device.

The detection component 11 is arranged in the writing device, the detection data of the use state of the writing pen 100 are obtained, and the obtained detection data are sent to the intelligent writing board 200 together with the color-related information of the writing pen 100. When the intelligent writing board 200 utilizes the detection data to determine that the use state of the writing pen 100 is the writing state, the color of the corresponding electronic handwriting of the writing pen 100 obtained during the writing state of the writing pen 100 is set to be the color corresponding to the color-related information, so that the handwriting of different colors formed in the process of writing with the writing pen 100 by the user may also be set to be the same color synchronously in the corresponding electronic handwriting, thereby improving the accuracy of color setting of the electronic handwriting.

The detection component 11 may include: a pressure sensor, configured to detect the use state of the writing pen 100: or a state switching key, configured to set the use state of the writing pen 100 in response to an operation of a user.

When the detection component 11 is the pressure sensor, the writing device may be wearable equipment, such as intelligent gloves, intelligent objects, etc., and the pressure sensor is arranged in the wearable equipment. When the user uses the wearable equipment to hold the writing pen 100 to write on the intelligent writing board 200, the pressure sensor detects a pressure of the writing pen 100 or figures on the pressure sensor, and when the pressure exceeds a writing pressure threshold, it is determined that the current state of the writing pen 100 is the writing state. Whether the pressure detected by the pressure sensor exceeds the writing pressure threshold may be determined by the writing device (at this time, the detection data are state data), or by the intelligent writing board 200 (at this time, the detection data are the pressure detected by the pressure sensor).

When the detection component 11 is the state switching key, the user may set the use state of the writing pen 100 through the state switching key, such as, when the user needs to use the writing pen 100 to write, the state of the writing pen 100 is set to be the writing state through the state switching key.

The detection component 11 may further be a photoelectric sensor, which may detect whether the user holds the writing pen 100 in hand. When it is detected that the user holds the writing pen 100, and if the writing track is also detected, it may be determined that the use state of the writing pen 100 is the writing state: or when a background receives information that the photoelectric sensor detects that the user holds the writing pen 100, combined with whether data of electronic handwriting corresponding to the writing track is also received, the use state of the writing pen 100 may be determined.

The detection component 11 may further be other sensors that may detect the writing pen 100, which is not limited here.

By using the pressure sensor as the detection component 11 to detect the use state of the writing pen 100, the use state of the writing pen 100 may be automatically determined.

By using the state switching key as the detection component 11 to detect the use state of the writing pen 100, a setting operation of the user may be responded according to the state switching key, so that the use state of the writing pen 100 is quickly set.

Figure 2:
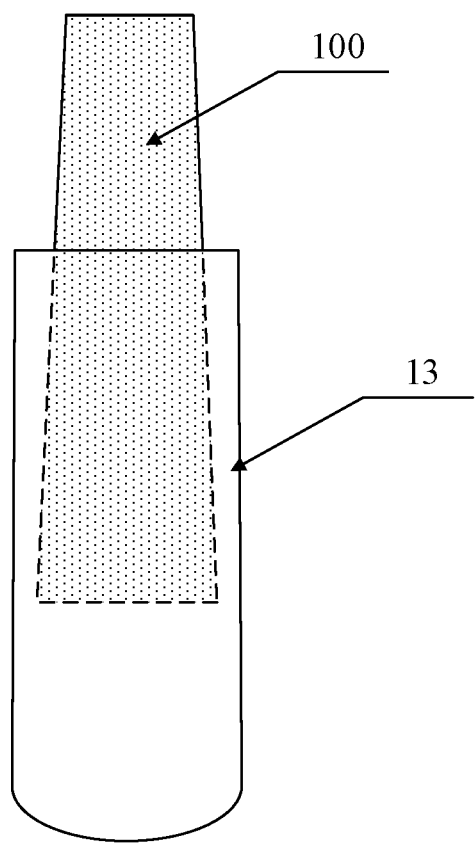
FIG. 2 is another schematic structural diagram of a writing device provided by an embodiment of the present disclosure.
Figure 3:
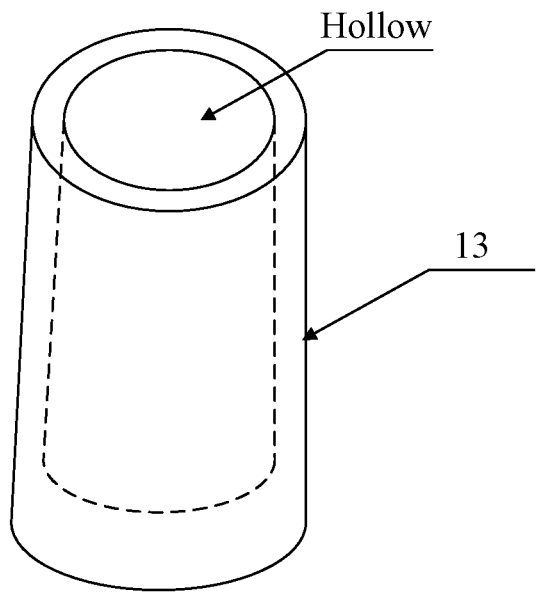
FIG. 3 is yet another schematic structural diagram of a writing device provided by an embodiment of the present disclosure.

Referring to FIG. 2 and FIG. 3. FIG. 2 is a schematic structural diagram of another writing device provided by an embodiment of the present disclosure. FIG. 3 is a schematic structural diagram of yet another writing device provided by an embodiment of the present disclosure, and the writing device further includes a containing part 13.

The containing part 13 is of a hollow structure (an area defined by a dotted line in FIG. 3), is configured to contain the writing pen 100.

When only a single writing pen 100 may be contained in the containing part 13, the writing device is held in the hand of the user. When the containing part 13 may contain multiple writing pens 100, the writing device is used as a pen box containing writing pens of the same color. When it is detected that the writing pen is taken out of the containing part 13, the intelligent writing board 200 determines the setting color of the handwriting according to the color bound by the writing device or the detected color.

When the writing device includes the containing part 13, if the detection component 11 in the writing device is the pressure sensor, the use state of the writing pen 100 may be determined through different ranges corresponding to a pressure value measured by the pressure sensor. For example, the pressure value may be divided into a corresponding pressure range when no writing pen is contained, where the corresponding pressure level is L0, and at this time, the writing device may be set to a standby mode; a pressure range when a writing pen is contained but does not perform writing, where the corresponding pressure level is L1; and a pressure range (larger than the writing pressure threshold) when a writing pen is contained and is under writing, where the corresponding pressure level is L2.

According to the pressure ranges corresponding to the above different pressure levels, the use state of the writing pen 100 may be determined.

Figure 4:
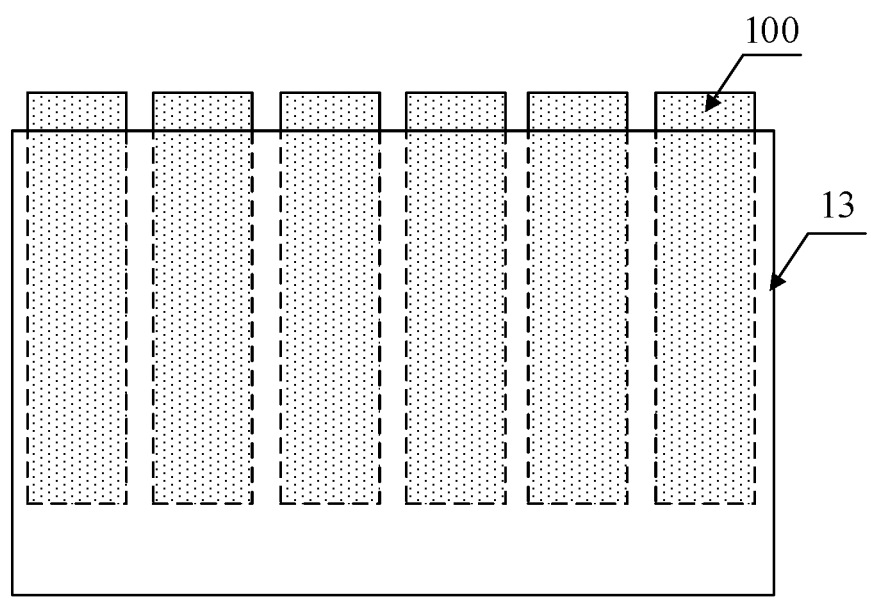
FIG. 4 is yet another schematic structural diagram of a writing device provided by an embodiment of the present disclosure.

Referring to FIG. 4, which is a schematic structural diagram of another writing device provided by the embodiment of the present disclosure, when multiple writing pens 100 may be contained in a pen holder B, the writing device is equivalent to an intelligent pen box. The writing pens 100 of the same color are placed in the intelligent pen box, when using the writing pen 100, the user takes the writing pen 100 of one color at a time, after the detection component 11 detects a signal that the user takes away the writing pen 100, the intelligent pen box transmits the detection data and the equipment identifier to the intelligent writing board 200 through the communication component 12, and determines the corresponding color according to a corresponding relationship between the equipment identifier and color stored locally, so that the color of the writing pen 100 used by the user is determined.

Figure 5:
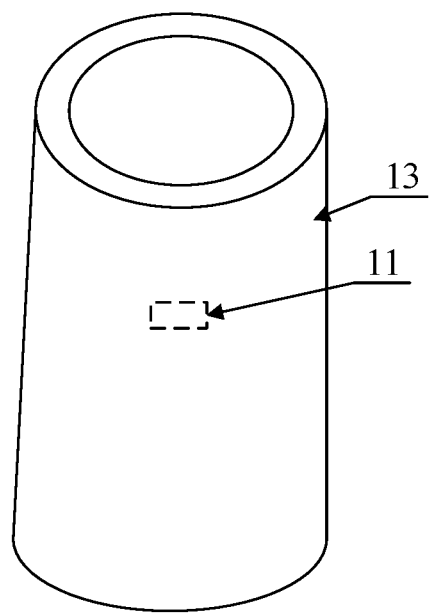
FIG. 5 is a schematic diagram of a set position of a detection component provided by an embodiment of the present disclosure.

Please refer to FIG. 5, which is a schematic diagram of a set position of a detection component provided by an embodiment of the present disclosure.

The detection component 11 is arranged on an outer wall of the containing part 13. As shown in FIG. 5, the detection component may be arranged in an area, easy to hold by the user, of the outer wall of the containing part 13.

The detection component 11 is arranged on the outer wall of the containing part 13, it is convenient to detect the pressure of user's fingers on the outer wall when writing, so that the use state of the writing pen 100 is quickly determined according to a magnitude of an acting force.

Figure 6:
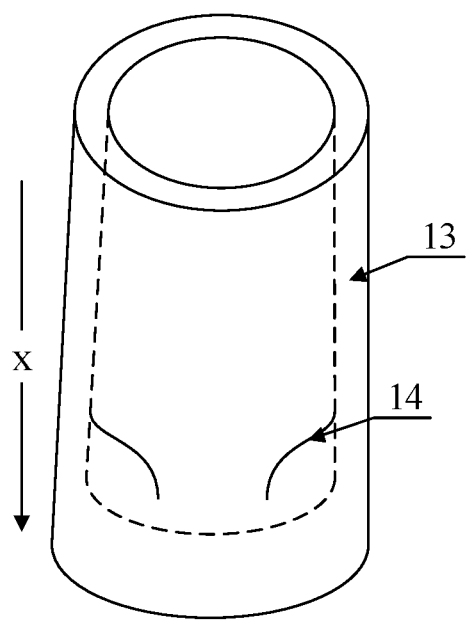
FIG. 6 is a schematic diagram of another writing device provided by an embodiment of the present disclosure.

Referring to FIG. 6, which is a schematic diagram of another writing device provided by an embodiment of the present disclosure.

The writing device further includes a fixing structure 14, arranged in an inner wall of the containing part 13 and configured to fix the writing pen 100.

Figure 7:
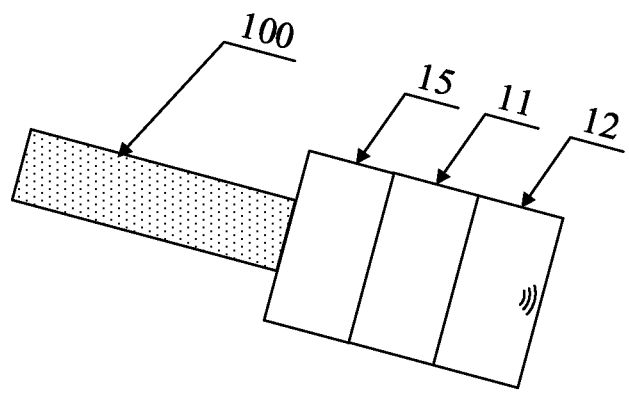
FIG. 7 is yet another schematic structural diagram of a writing device provided by an embodiment of the present disclosure.

The fixing structure 14 includes: a damping structure; or at least two spring sheets, where the at least two spring sheets define a funnel-shaped structure with an opening gradually decreasing in a first direction X, as shown in FIG. 7, and the first direction X is a direction in which the writing pen enters the containing part 13.

The damping structure may be, for example, a rubber sleeve, or a lead-out structure similar to a mechanical pencil.

The fixing structure 14 for fixing the writing pen 100 is arranged in the containing part 13, the writing pen 100 may be prevented from loosening. For example, the writing pen 100 is a chalk and may be connected with broken chalk.

Please refer to FIG. 7, which is yet another schematic structural diagram of a writing device provided by an embodiment of the present disclosure. In the writing device, a color determination component 15 may further be arranged, and configured to determine the color of the writing pen 100.

The color determination component 15 may be a color sensor, configured to recognize the color of the writing pen 100. For example, when the color sensor recognizes that the color of the writing pen 100 is red, the corresponding data are used as the color-related information to be sent to the intelligent writing board 200 through the communication component 12.

It should be noted that a positional relationship of the detection component 11, the communication component 12 and the color determination component 15 shown in FIG. 7 does not represent its real positional relationship, and the color determination component 15 needs to be arranged at a position that may detect the color of the writing pen 100.

Figure 8:
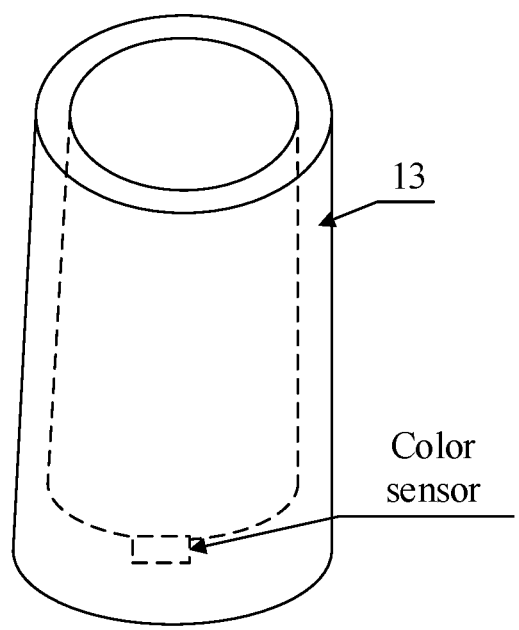
FIG. 8 is a schematic diagram of a set position of a color sensor provided by an embodiment of the present disclosure.
Figure 9:
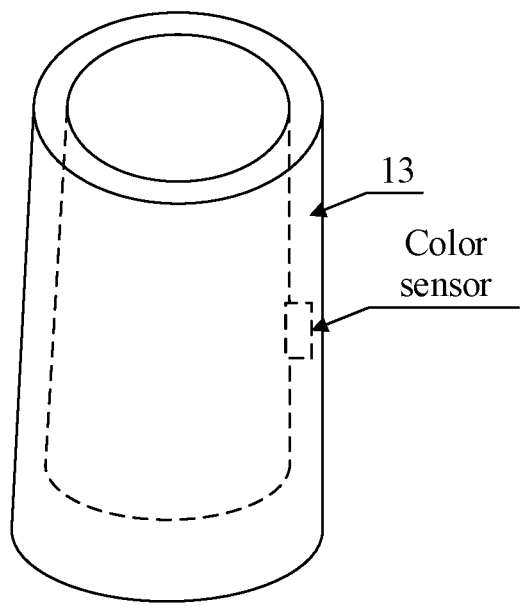
FIG. 9) is a schematic diagram of another set position of a color sensor provided by an embodiment of the present disclosure.

The color sensor is arranged in the inner wall of the containing part 13, and its set position may refer to FIG. 8 and FIG. 9. FIG. 8 is a schematic diagram of a set position of a color sensor provided by an embodiment of the present disclosure, and FIG. 9 is a schematic diagram of another set position of a color sensor provided by an embodiment of the present disclosure. The color sensor does not make contact with the writing pen 100. For example, an opening is formed in the inner wall of the containing part 13, and the color sensor is placed in the opening.

Figure 10:
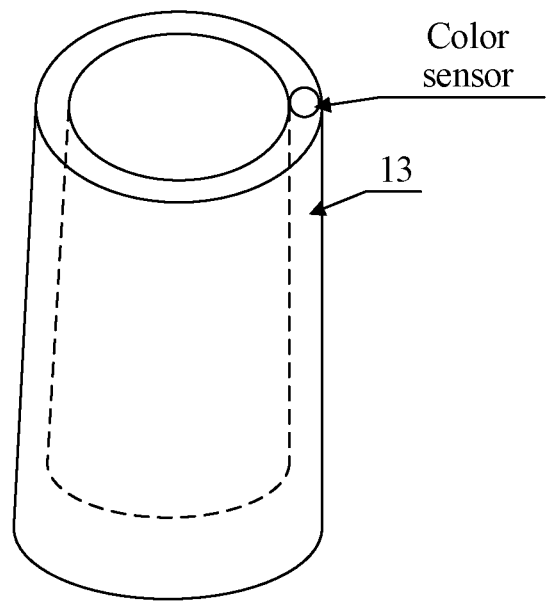
FIG. 10 is a schematic diagram of yet another set position of a color sensor provided by an embodiment of the present disclosure.

Referring to FIG. 10, which is a schematic diagram of yet another set position of a color sensor provided by an embodiment of the present disclosure.

The color sensor may further be arranged at an opening end of the containing part 13, and the opening end is an end close to the handwriting when the writing pen 100 is used. For example, an opening is formed in the opening end, and the opening may contain the color sensor. The color sensor may be an optical sensor.

The color sensor is arranged at the opening end of the containing part 13, so that it is convenient to directly collect the handwriting color of the writing pen 100.

The color determination component 15 may further be a color switching key, configured to switch a color currently corresponding to the writing device in response to the user, where when the color switching key is switched to different states, corresponding bound colors are different.

For example, the color switching key may correspond to 5 states, and these 5 states are represented by numbers 1-5 in turn, representing 5 different colors. By pressing the color switching key every one time, it switches to the next state (that is, switching to next color), and so on. For example, the current color switching key corresponds to the number 4 (corresponding to red), the user presses the color switching key once, the number corresponding to the color switching key is changed into 5 (corresponding to yellow), and when the user presses the color switching key again, the number corresponding to the color switching key is changed into 1 (corresponding to green).

The writing device may further include an indication component, arranged on the outer wall of the containing part 13 and configured to indicate a color corresponding to the writing device. The indication component may indicate a color according to the color bound to the writing device, or the color of the writing pen 100 determined by the color determination component 15, so as to facilitate the user to set the color bound to the writing device, or indicate the user to put in the writing pen 100 of the correct color.

The indication component may be an indicator lamp, a liquid crystal screen or other apparatuses that may indicate the corresponding color of the writing device.

For example, if the color bound to the writing device is white, the indication component may turn on a white lamp if it is the indicator lamp. Alternatively, the color sensor detects that the color of the writing pen 100 is blue, if the indication component is the liquid crystal screen, it may make the screen display turn blue or display the corresponding characters 'two Chinese characters of Lan Se' or 'blue', or the color switching key switches the current color bound to the writing device to red, if the indication component is a nixie tube, the corresponding number or letter may be displayed, such as, if the number is 1, it may display 1, and if the corresponding letter is P, it may display 'P'.

A power supply of the writing device may adopt a battery, such as a button battery, an alkaline battery, or a rechargeable battery. When the rechargeable battery is adopted, a corresponding changing port is formed in the writing device.

Based on the same inventive concept, an embodiment of the present disclosure provides an intelligent writing board. For the specific implementation of the intelligent writing board, may refer to the relevant description in the embodiment part of the attribute device, and repetition will not be made. The intelligent writing board includes a touch device and a writing panel, and the touch device is configured to recognize handwriting formed in the writing panel, and includes: the writing device described as the above.

The intelligent writing board is configured to receive detection data and color-related information of a writing pen sent by the writing device, where the detection data are data corresponding to a use state of the writing pen, and the use state includes a writing state and a non-writing state; the use state of the writing pen is determined according to the detection data; and when the use state of the writing pen is determined to be the writing state, a color of electronic handwriting of the writing pen obtained during the writing state of the writing pen is set to be a color corresponding to the color-related information.

Figure 11:
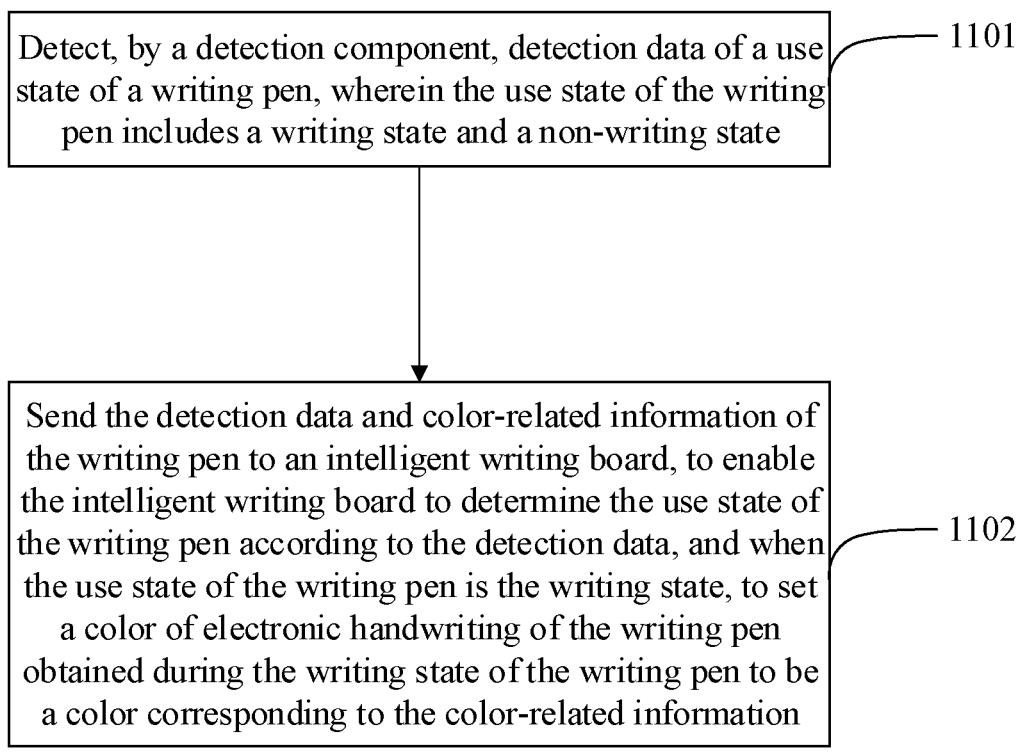
FIG. 11 is a flow chart of a method for setting a color of electronic handwriting of a writing device provided by an embodiment of the present disclosure.

Based on the same inventive concept, an embodiment of the present disclosure provides a method for setting a color of electronic handwriting, applied to a writing device for use with a writing pen. The structure and composition of the writing device may refer to description of the embodiment of the writing device, repetition will not be made, referring to FIG. 11, the method includes S1101 and S1102.

S1101, detection data of a use state of the writing pen are obtained by a detection component, where the use state of the writing pen includes a writing state and a non-writing state.

S1102, the detection data and color-related information of the writing pen are sent to an intelligent writing board, so that the intelligent writing board determines the use state of the writing pen according to the detection data, and when the use state of the writing pen is determined to be the writing state, sets a color of electronic handwriting of the writing pen obtained during the writing state of the writing pen to be a color corresponding to the color-related information.

The color-related information may include an equipment identifier of the writing device, or color information of the writing pen.

In a possible implementation, when the color-related information includes the color information of the writing pen, before the detection data and the color-related information of the writing pen are sent to the intelligent writing board, the method further includes: determining the color information according to a current state of a color switching key, where the color switching key includes a plurality of states, and each state corresponds to a color; or determining the color information according to information that a photoelectric sensor detects that the writing pen is taken away.

In a possible implementation, when the color-related information includes the equipment identifier, the writing device has a binding relationship with a specified color; and when a user uses the writing device, a color of the writing pen is consistent with the specified color.

In a possible implementation, when the color-related information includes the equipment identifier and the color information of the writing pen, before the detection data and the color-related information of the writing pen are sent to the intelligent writing board, the method further includes: obtaining the color information by recognizing by a color sensor a color of the writing pen.

In a possible implementation, the method further includes: indicating the color of the writing pen according to the color-related information.

Figure 12:
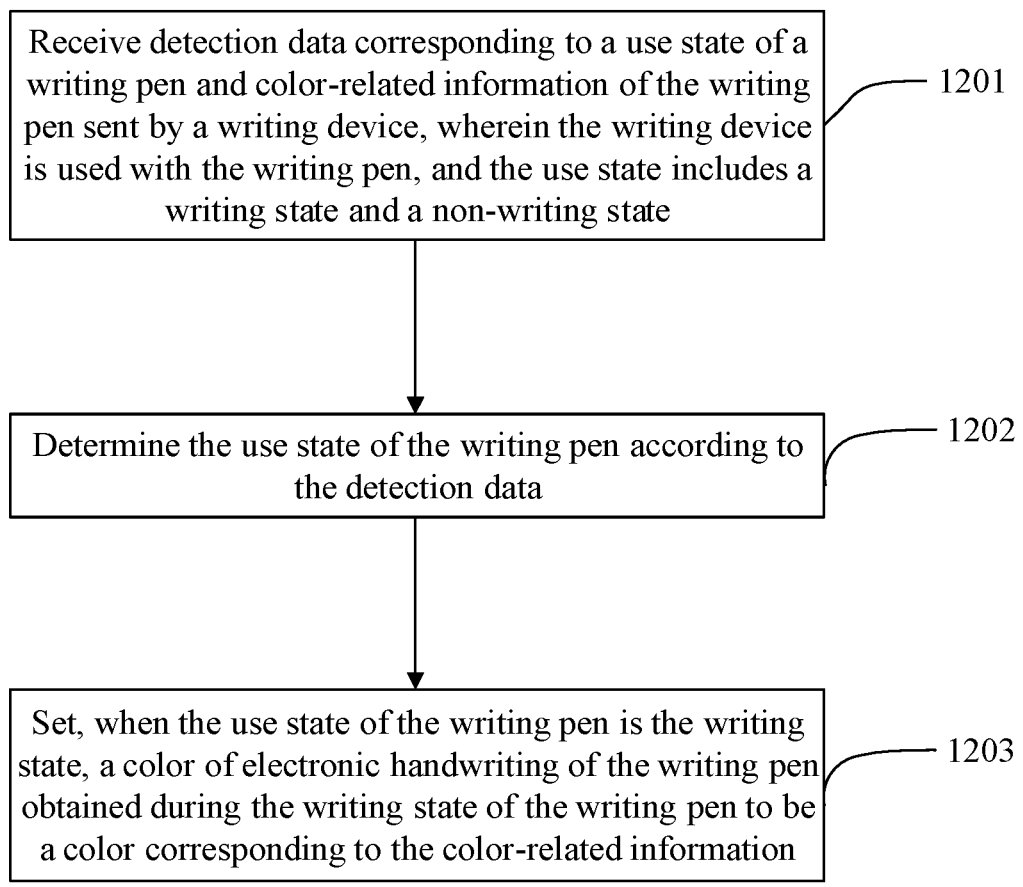
FIG. 12 is a flow chart of a method for setting a color of electronic handwriting of an intelligent writing board provided by an embodiment of the present disclosure.

Based on the same inventive concept, an embodiment of the present disclosure provides a method for setting a color of electronic handwriting, applied to the intelligent writing board. For the structure and composition of the intelligent writing board, please refer to the description of the embodiment part of the intelligent writing board, and repetition will not be made. Please refer to FIG. 12, the method includes S1201, S1202 and S1203.

S1201, detection data corresponding to a use state of a writing pen and color-related information of the writing pen sent by a writing device are received, where the writing device is used with the writing pen, and the use state includes a writing state and a non-writing state.

S1202, the use state of the writing pen is determined according to the detection data.

S1203, when the use state of the writing pen is determined to be the writing state, a color of electronic handwriting of the writing pen obtained during the writing state of the writing pen is set to be a color corresponding to the color-related information.

In a possible implementation, the color-related information includes: an equipment identifier of the writing device, or color information of the writing pen.

In a possible implementation, the setting the color of the electronic handwriting of the writing pen obtained during the writing state of the writing pen to be the color corresponding to the color-related information, includes: when the color-related information includes the equipment identifier, a corresponding set color is obtained from a binding relationship between the equipment identifier and the color of the writing pen according to the equipment identifier; and the color of the electronic handwriting obtained during the writing state of the writing pen is set to be the set color.

In the possible implementation, the setting the color of the electronic handwriting of the writing pen obtained during the writing state of the writing pen to be the color corresponding to the color-related information, includes: when the color-related information includes the color information of the writing pen, the color of the electronic handwriting obtained during the writing state of the writing pen is set to be a corresponding color according to the color information of the writing pen.

Based on the same inventive concept, an embodiment of the present disclosure provides a device for setting a color of electronic handwriting, including: at least one processor: and a memory connected with the at least one processor, wherein the memory stores instructions executable by the at least one processor, and the at least one processor executes the above method for setting the color of the electronic handwriting by executing the instructions stored in the memory.

Based on the same inventive concept, an embodiment of the present disclosure further provides a readable storage medium, including: a memory, wherein the memory is configured to store instructions, when the instructions are executed by a processor, a device including the readable storage medium is enabled to complete the above method for setting the color of the electronic handwriting.

Those skilled in the art will appreciate that embodiments of the present disclosure may be provided as a method, a system or a computer program product. Therefore, the embodiments of the present disclosure may take the form of a complete hardware embodiment, a complete software embodiment, or an embodiment combining software and hardware aspects. Further, the embodiments of the present disclosure may take the form of computer program products implemented on one or more computer usable storage media (including but not limited to a disk memory, a CD-ROM, an optical memory, etc.) containing computer usable program codes.

The embodiments of the present disclosure are described with reference to flow charts and/or block diagrams of the method, equipment (system) and a computer program product according to the embodiments of the present disclosure. It should be understood that each flow and/or block in the flow charts and/or block diagrams and the combination of flows and/or blocks in the flow charts and/or block diagrams can be realized by computer program instructions. These computer program instructions may be provided to a processor of a general-purpose computer, a special-purpose computer, an embedded processor or other programmable data processing equipment to generate a machine, so that a device for realizing functions specified in one or more flows of the flow charts and/or one or more blocks of the block diagrams is generated by the instructions executed by the processor of a computer or other programmable data processing equipment.

These computer program instructions may also be stored in a computer-readable memory that can guide a computer or other programmable data processing equipment to work in a specific mode, so that the instructions stored in the computer-readable memory generate a manufactured product including an instruction device, and the instruction device realizes the functions specified in one or more flows of the flow charts and/or one or more blocks of the block diagrams.

These computer program instructions may also be loaded on a computer or other programmable data processing equipment, so that a series of operation steps are executed on the computer or other programmable equipment to generate computer implemented processing. Therefore, the instructions executed on the computer or other programmable equipment provide steps for realizing the functions specified in one or more flows of the flow charts and/or one or more blocks of the block diagrams.

Obviously, those skilled in the art can make various changes and modifications to the present disclosure without departing from the spirit and scope of the present disclosure. As such, provided that these modifications and variations of the present disclosure fall within the scope of the claims of the present disclosure and their equivalents, the present disclosure is also intended to cover such modifications and variations.

What is claimed is:

1. A writing device, comprising:
    a detection component, configured to obtain detection data of a use state of a writing pen, wherein the use state comprises a writing state and a non-writing state;
    a communication component, configured to send the detection data and color-related information of the writing pen to an intelligent writing board, to enable the intelligent writing board to determine the use state of the writing pen according to the detection data, and when the use state of the writing pen is the writing state, to set a color of electronic handwriting of the writing pen obtained during the writing state of the writing pen to be a color corresponding to the color-related information;
    a color determination component, configured to determine a color of the writing pen, wherein the color determination component comprises a color sensor configured to recognize the color of the writing pen;
a containing part, being of a hollow structure; and
a fixing structure, arranged in an inner wall of the containing part; wherein the fixing structure comprises at least two spring sheets, defining a funnel-shaped structure with an opening gradually decreasing in a first direction, wherein the first direction is a direction in which the writing pen enters the containing part;
wherein the writing pen is a chalk;
wherein the detection component is arranged on an outer wall of the containing part and the detection component comprises a state switching key, configured to set the use state of the writing pen in response to an operation of a user;
wherein the color sensor is arranged at an opening end of the containing part, and the opening end is an end close to the handwriting when the writing pen is used.

2. The writing device according to claim 1, wherein the communication component comprises a near-field communication element or a Bluetooth communication element.

3. The writing device according to claim 1, wherein the containing part is configured to contain the writing pen.

4. The writing device according to claim 1, wherein the fixing structure is configured to fix the writing pen.

5. The writing device according to claim 1, further comprising:
an indication component, arranged on the outer wall of the containing part and configured to indicate a color corresponding to the writing device.

6. The writing device according to claim 1, wherein the writing device comprises wearable equipment.

7. A method for setting the color of the electronic handwriting, applied to the writing device according to claim 1, and comprising:
obtaining, by the detection component, the detection data of the use state of the writing pen, wherein the use state of the writing pen comprises the writing state and the non-writing state; and
sending the detection data and the color-related information of the writing pen to the intelligent writing board, to enable the intelligent writing board to determine the use state of the writing pen according to the detection data, and when the use state of the writing pen is the writing state, to set the color of the electronic handwriting of the writing pen obtained during the writing state of the writing pen to be the color corresponding to the color-related information;
wherein when the color-related information comprises the color information of the writing pen, before sending the detection data and the color-related information of the writing pen to the intelligent writing board, the method further comprises:
obtaining the color information by recognizing, by the color sensor, the color of the writing pen; and
setting, by the state switching key of the detection component, the use state of the writing pen in response to the operation of the user.

8. An intelligent writing board, comprising a touch device and a writing panel, wherein the touch device is configured to recognize handwriting formed in the writing panel, and comprises:
a writing device, comprising:
a detection component, configured to obtain detection data of a use state of a writing pen, wherein the use state comprises a writing state and a non-writing state;
a communication component, configured to send the detection data and color-related information of the writing pen to the intelligent writing board, to enable the intelligent writing board to determine the use state of the writing pen according to the detection data, and when the use state of the writing pen is the writing state, to set a color of electronic handwriting of the writing pen obtained during the writing state of the writing pen to be a color corresponding to the color-related information;
a color determination component, configured to determine a color of the writing pen, wherein the color determination component comprises a color sensor configured to recognize the color of the writing pen;
a containing part, being of a hollow structure; and
a fixing structure, arranged in an inner wall of the containing part; wherein the fixing structure comprises at least two spring sheets, defining a funnel-shaped structure with an opening gradually decreasing in a first direction, wherein the first direction is a direction in which the writing pen enters the containing part;
wherein the writing pen is a chalk;
wherein the detection component is arranged on an outer wall of the containing part and the detection component comprises a state switching key, configured to set the use state of the writing pen in response to an operation of a user;
wherein the color sensor is arranged at an opening end of the containing part, and the opening end is an end close to the handwriting when the writing pen is used; and
wherein the intelligent writing board is configured to receive the detection data and the color-related information of the writing pen sent by the writing device, wherein the detection data are data corresponding to the use state of the writing pen, and the use state comprises the writing state and the non-writing state; the use state of the writing pen is determined according to the detection data; and when the use state of the writing pen is determined to be the writing state, the color of electronic handwriting of the writing pen obtained during the writing state of the writing pen is set to be the color corresponding to the color-related information.

9. A method for setting the color of the electronic handwriting, applied to the intelligent writing board according to claim 8, and comprising:
receiving the detection data corresponding to the use state of the writing pen and the color-related information of the writing pen sent by the writing device, wherein the writing device is used with the writing pen, and the use state comprises the writing state and the non-writing state, wherein the use state of the writing pen is set in response to the operation of the user;
determining the use state of the writing pen according to the detection data; and
setting, when the use state of the writing pen is the writing state, the color of the electronic handwriting of the writing pen obtained during the writing state of the writing pen to be the color corresponding to the color-related information;
wherein the setting the color of the electronic handwriting of the writing pen obtained during the writing state of the writing pen to be the color corresponding to the color-related information, comprises:
when the color-related information comprises color information of the writing pen, setting the color of the electronic handwriting obtained during the writing state of the writing pen to be a corresponding color according to the color information of the writing pen.

\* \* \* \* \*